Patented Nov. 30, 1937

2,100,351

UNITED STATES PATENT OFFICE 2,100,351

PROCESS OF MAKING PLASTIC SUBSTANCES AND PRODUCT OBTAINED

Joseph C. Patrick, Trenton, N. J.

No Drawing. Application November 14, 1934,
Serial No. 752,945

4 Claims. (Cl. 260—6)

This is a continuation in part of my application, Serial No. 186,588, filed April 25, 1927 upon which Patent No. 1,996,486 was issued April 2, 1935.

I have found that a factitious plastic substance may be produced by the treatment of an olefin type hydrocarbon compound with an alkaline polysulfide. The hydrocarbon compound is preferably present in the form of its additive compounds, such as, for example, the halogen derivatives. The product obtained by such a method is of a very pale color, of considerable tensile strength, good adhesion and cohesion values, high elasticity, and is capable of several physical conditions as to pliability within wide ranges of temperatures, impermeable to water and gases and not affected by many solvents, of high dielectric value and having a specific gravity higher than that of water. Such products are not injured by boiling with dilute acids, alkalies, or oxidizing agents. In general, the material resembles rubber in physical properties but differs therefrom in its chemical constituency and stability.

A substance having additional desirable properties can be produced by the incorporation of a metallic soap, preferably, but not necessarily, an insoluble metallic soap, in intimate mixture with the substance described above. This incorporation may, for example, be accomplished by the addition of a material containing the radical of a fatty acid or the fatty acid itself to the product either before or after the sulfurizing reaction: with the addition of a metallic base, so that the acid and the base unite to form soap within the material. In this way the finished plastic substance has an increased toughness and hardness, and constitutes a superior product which may be used in different places or for different purposes, such as a floor or roof covering, impregnant for fabric, base material for tires, tubes, surgical articles usually made of rubber, and the like. The product is more receptive to the incorporation of pigments, is more easily molded, and there is a very considerable increase in tensile strength.

The ability of certain solvents, such as carbon disulfide, for example, to disperse the new plastic substance can be utilized to maintain the dispersion in a less viscous condition, but such solvent can be evaporated off from the product in forming the finished article.

In carrying out this invention, the derivatives obtained by the action of chlorine upon the permanently gaseous products that are obtained in the intensive cracking of petroleum hydrocarbon, which may consist largely of ethylene, propylene, and butylene, with traces of amylene and other similar hydrocarbons, whereby oily halogen additive compounds containing the hydrocarbon radicals are formed, having boiling points between about 80° C. and about 200° C., are used. A slurry of hydrated lime is treated with sulfur at a boiling temperature until saturation occurs; and the solution is then diluted with water to adjust the specific gravity to substantially that of the halide oil. 100 gallons of this calcium polysulfide solution is mixed with approximately 50 gallons of the halide oil. Reaction occurs at ordinary temperatures, but is preferred to accelerate this reaction by heating in a reflux apparatus having an agitator to a temperature slightly above the boiling point of the halide oil. A resulting product of at least 25 lbs. of plastic material is obtained, which is boiled with water to drive off occluded volatile substances and compounds.

Twenty pounds of this plastic material, calculated on a dry basis, is placed in carbon disulfide and masticated. At the completion of the mastication or kneading, the mass should be pasty and of about the consistency of a thick molasses. One pound of oleic acid is added and the kneading operation is continued until a thorough incorporation has occurred. Two pounds of litharge are then added and the kneading continued for thorough incorporation: during the course of such kneading a reaction occurs between parts of the litharge and the oleic acid to produce a soap, lead oleate, which is insoluble and produces desirable changes in the plastic material. The solvent is removed by evaporation.

The material may be mixed with filling materials such as asbestos fibre, fragments of cloth, sand, or dust, barium sulfate, fibre, etc., as well as with other pigments to produce a desired color, or for other purposes, such as the mineral earth pigments, Venetian red, chrome green, ochres, etc.: and the mass may then be pressed into a fabric backing to produce a floor covering. It is desirable to maintain the plastic dispersed in the solvent until the operation of impregnation of the fabric has occurred, since in this way the mass is maintained in a less viscous condition. The solvent is thereafter removed by evaporation, and the floor covering is ready for use. Such a floor covering is resistant to water and heat, and is not attacked by alkaline and acid solutions: the impregnated mass is also an insecticide and vermicide, and protects the material against the attacks of insect and vegetable parasites.

While oleic acid has been described as a material containing a fatty acid radical, it has been found that other fatty acids, such as stearic and linoleic acids, may be employed, as well as the fatty acids obtained from various oils, fats and waxes: and that the material may be added in the form of fatty glycerides. Radicals of one or more of the acids may be employed as desired. The litharge may be replaced by the oxides of barium, calcium, magnesium, zinc, etc. or the corresponding carbonates or other salts of weak acids which are capable of saponifying the material containing the fatty acid radicals.

I claim:

1. The process which comprises chlorinating gaseous products consisting largely of hydrocarbons of the olefin type obtained from cracked petroleum hydrocarbons until an oily mixture having a boiling point between about 80° C. and about 200° C. is obtained, and treating the chlorinated mixture with an alkaline polysulfide solution.

2. A plastic comprising products of reaction between an alkaline polysulfide solution and organic compounds which consist of hydrocarbons of the olefin type obtained from cracked petroleum hydrocarbons that have been chlorinated, said chlorinated compounds having a boiling point between about 80° C. and about 200° C.

3. A plastic comprising products of reaction between an alkaline polysulfide solution and products consisting of hydrocarbons of the olefin type obtained from cracked petroleum hydrocarbons that have been chlorinated that were gaseous before chlorination, said chlorinated products having a boiling point between about 80° C. and about 200° C.

4. A plastic comprising products of reaction between an alkaline polysulfide and products consisting largely of ethylene, propylene and butylene obtained from cracked petroleum hydrocarbons that have been chlorinated, said chlorinated products having a boiling point between about 80° C. and about 200° C.

JOSEPH C. PATRICK.